United States Patent
Merideth

(10) Patent No.: US 8,960,620 B1
(45) Date of Patent: Feb. 24, 2015

(54) ADJUSTABLE SUPPORT FOR AIR CONDITIONERS

(71) Applicant: Mark Ray Merideth, Roseville, CA (US)

(72) Inventor: Mark Ray Merideth, Roseville, CA (US)

(73) Assignee: Uni-Products, Inc., North Highlands, CA (US)

( * ) Notice: Subject to any disclaimer, the term of this patent is extended or adjusted under 35 U.S.C. 154(b) by 0 days.

(21) Appl. No.: 14/105,312

(22) Filed: Dec. 13, 2013

(51) Int. Cl.
*A47G 29/02* (2006.01)
*F16M 13/02* (2006.01)

(52) U.S. Cl.
CPC ..................... *F16M 13/02* (2013.01)
USPC ........... 248/237; 248/148; 248/676; 248/678; 52/27; 52/58; 52/60; 52/126.1

(58) Field of Classification Search
CPC ....... F24F 13/32; F24F 2221/16; F24F 13/00; F28F 9/007; E04G 3/26; F16M 13/02
USPC ......... 248/237, 676, 678, 148, 346.01; 52/27, 52/58, 60, 72, 126.1, 126.8, 200; 62/297
See application file for complete search history.

(56) References Cited

U.S. PATENT DOCUMENTS

| 3,742,659 | A | * | 7/1973 | Drew | 52/19 |
| 4,513,939 | A | * | 4/1985 | Berger et al. | 248/544 |
| 4,526,091 | A | * | 7/1985 | Sharp | 454/254 |
| 4,887,399 | A | * | 12/1989 | Berger et al. | 52/27 |
| 4,895,066 | A | * | 1/1990 | Carnahan | 454/275 |
| 4,917,345 | A | * | 4/1990 | Czech | 248/678 |
| 5,409,266 | A | * | 4/1995 | Baker | 285/44 |
| 5,454,538 | A | * | 10/1995 | Merideth | 248/237 |
| 5,687,514 | A | * | 11/1997 | Gillispie | 52/58 |
| 5,791,092 | A | * | 8/1998 | Strieter | 52/27 |
| 6,343,439 | B1 | * | 2/2002 | Rutledge | 52/27 |
| 7,950,620 | B2 | * | 5/2011 | Knight | 248/676 |

OTHER PUBLICATIONS

R30-Series MAC curb made available by Modular Metal Fabricators Inc.

* cited by examiner

Primary Examiner — Todd M Epps
(74) Attorney, Agent, or Firm — Thomas R. Lampe

(57) ABSTRACT

An adjustable air conditioner curb includes a curb base having reinforcement members connected thereto and a curb frame adjustably positionable relative to the curb base and positionable between the curb base and the reinforcement members and connected thereto to maintain the curb frame in fixed position.

11 Claims, 3 Drawing Sheets

ADJUSTABLE SUPPORT FOR AIR CONDITIONERS

TECHNICAL FIELD

This invention relates to an air conditioner support system comprising an adjustable air conditioner curb.

BACKGROUND OF THE INVENTION

Support devices known as curbs are commonly employed to mount air conditioners on an inclined roof of a building. The air conditioner itself is maintained on the level (in a horizontal attitude) to allow proper operation thereof.

It has been long time practice to custom build curbs so that they can be utilized with roofs of a particular degree of inclination. That is, a particular curb is constructed to maintain the air conditioner at a level for a particular degree of incline.

It is known to provide adjustable curbs which may be utilized for a relatively limited range of roof inclinations. Upon installation, the adjustable curb can be adjusted to ensure that the air conditioner is on the level regardless to the degree or pitch or inclination of the roof to which it is attached.

A representative adjustable curb apparatus for mounting an air conditioner is shown in U.S. Pat. No. 5,454,538 wherein a pivotal interconnection is provided between two support members, the members being secured together by mechanical fasteners to prevent relative movement thereof when the desired relative positioning of the support members is attained.

It is also known to provide modular adjustable curbs which are not pivotally interconnected. An example is the R30-Series MAC curb made available by Modular Metal Fabricators Inc. In this arrangement a base formed from a single layer of galvanized steel sheet is attached to the roof. The base includes four upstanding base sides formed of 18 gauge galvanized steel. An upper module which has wooden elements is nailed directly to wooden elements the base side walls, the installer having positioned the upper module at the desired pitch. Adjustment is quite limited as is the curb height obtainable with such construction. For this reason, different heights of modular adjustable curbs are made available.

Furthermore, a modular adjustable curb arrangement of the prior art type just described is of insufficient strength to resist deformation or failure thereof when supporting an air conditioner in the case of earthquake or application of other comparable forces.

DISCLOSURE OF INVENTION

The present invention relates to a curb which is adjustable and may be utilized for a very wide range of roof inclinations as well as to attain different heights with a single unit. That is, one unit constructed in accordance with the teachings of the present invention takes the place of and avoids the requirement for a plurality different height curbs.

Furthermore, the curb of the present invention is characterized by its high strength and resistance to deformation upon application of seismic and other comparable forces thereto.

The adjustable air conditioner curb of the present invention includes a curb base having a roof attachment structure for attaching the curb base to a roof. The curb base also includes base side walls extending upwardly from the roof attachment structure.

A plurality of reinforcement members having upper ends and lower ends are spaced from one another. The lower ends of the reinforcement members are attached to the roof attachment structure and extend upwardly therefrom adjacent to the base side walls. The base side walls and the reinforcement members form open topped receptacles defining receptacle interiors above the reinforcement member lower ends.

A curb frame of the invention utilized to support an air conditioner has downwardly extending curb frame side walls positionable in the receptacle interiors of the open topped receptacles and selectively adjustable relative to the curb base and the reinforcement members.

Connectors are provided for attaching the curb frame to the curb base and to the reinforcement members whereby the curb frame is fixedly attached at a selected predetermined position relative to the curb base.

Other features, advantages and objects of the present invention will become apparent with reference to the following description and accompanying drawings.

MODE FOR CARRYING OUT THE INVENTION

Figure 1:
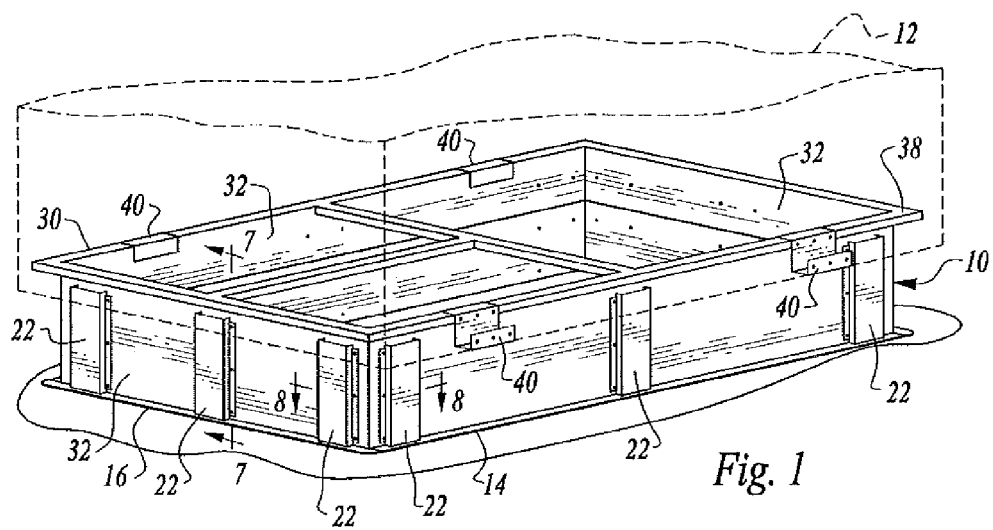
FIG. 1 is a perspective view of the air conditioner curb of the present invention in assembled condition with the curb base and curb frame thereof in non pivoted, non angular orientation.
Figure 2:
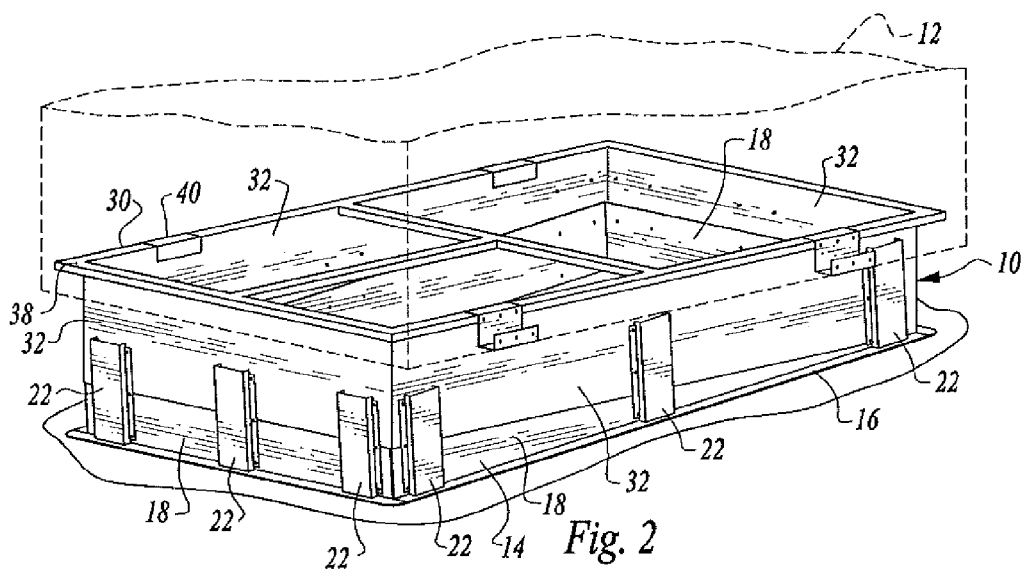
FIG. 2 is a view similar to FIG. 1, but showing the curb frame of the curb pivoted relative to the curb base.
Figure 3:
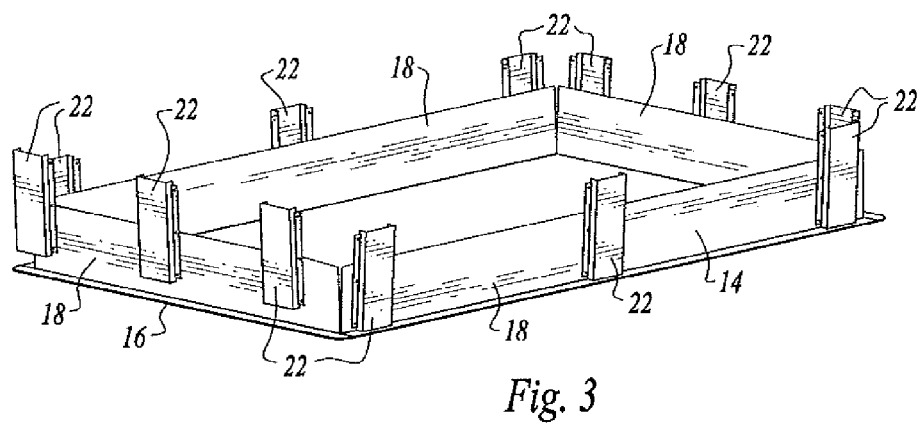
FIG. 3 is a perspective view of the curb base and a plurality of reinforcement members operatively associated with the curb base, all but three of the reinforcement members shown fixedly attached to a peripheral flange of the curb base, the other three shown prior to securement to the flange.

Referring now to the drawings, an adjustable air conditioner curb constructed in accordance with the teachings of the present invention is identified by reference numeral 10. The curb 10 is adjustable and is for mounting an air conditioner 12 (shown in dash lines in FIGS. 1 and 2) on a roof.

Curb 10 includes a curb base 14 having a roof attachment structure for attaching the curb base to a roof. In this instance, the roof attachment structure comprises a flange 16. The curb base also includes base side walls 18 which extend upwardly from the flange 16. The curb base is suitably made of sheet metal. The base side walls 18 have distal ends 20 which are not attached to the distal ends of adjacent base side walls. At least some of the distal ends may be tapered and each base side wall 18 is independently bendable or pivotal relative to flange 16.

Figure 4:
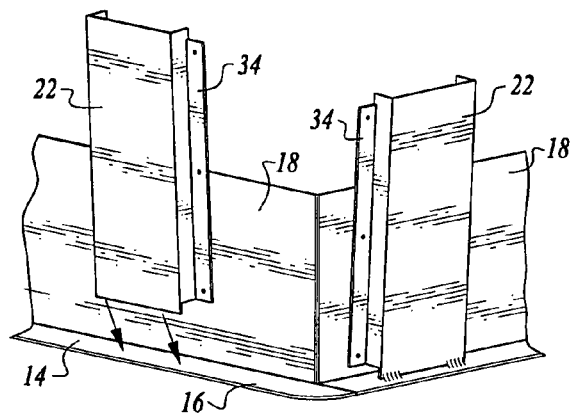
FIG. 4 is a greatly enlarged, perspective view illustrating a portion of the curb base with one of the reinforcement members welded to the flange of the base and one of the reinforcement members prior to welding thereof to the flange.
Figure 5:
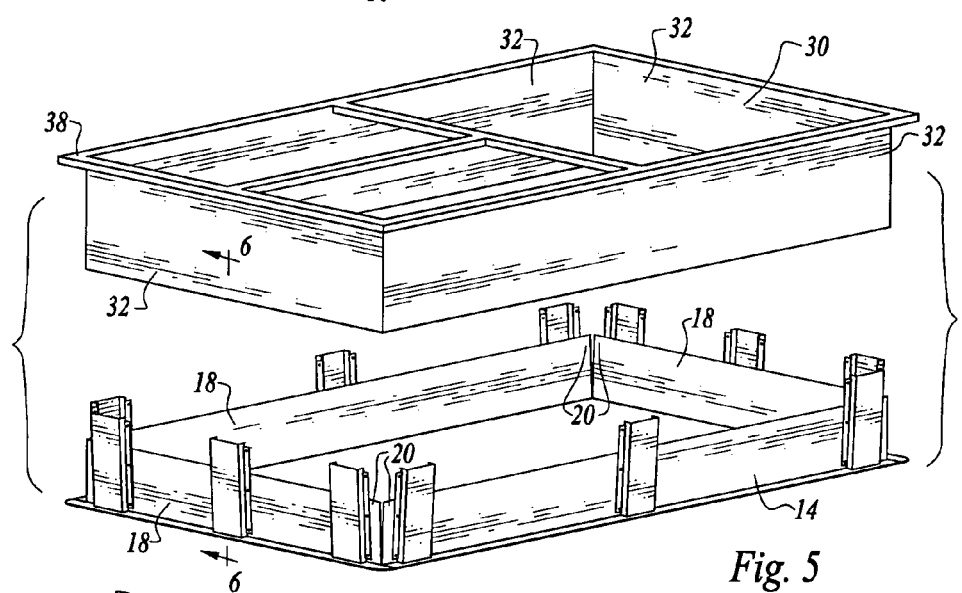
FIG. 5 is an exploded, perspective view illustrating the curb frame of the curb prior to positioning into engagement with the curb base and reinforcement members affixed to the curb base.

A plurality of reinforcement members comprising elongated, rigid, vertically extending stiffeners 22 in the form of metal channels. The stiffeners 22 are spaced from one another and have upper ends and lower ends. The lower ends of the stiffeners are attached to the curb base and more particularly the lower ends are welded to flange 16 (see FIG. 4).

The stiffeners extend upwardly from the flange 16 adjacent to the base side walls 18. The base side walls 18 and the stiffeners 22 form open topped receptacles defining receptacle interiors 24 above the stiffener lower ends. See FIG. 6.

Figure 9:
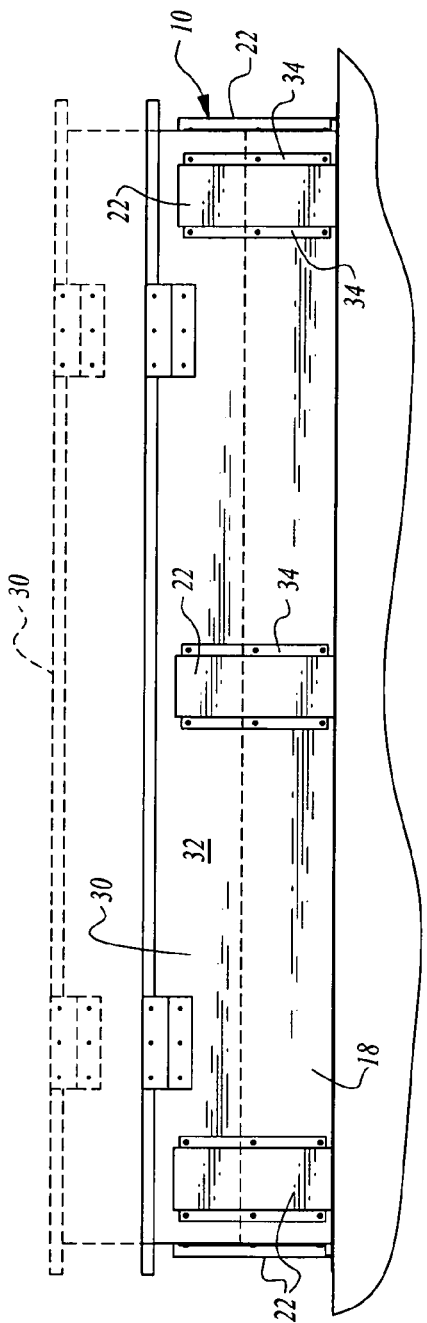
FIG. 9 is a frontal, elevational view showing the curb base on a horizontal roof surface, the curb frame depicted by solid lines being in a horizontal lowermost position relative to the curb base, and the curb frame in an alternative position shown by dash lines wherein the curb frame is elevated in its entirety relative to the curb base, the reinforcement members utilized to directly engage the curb frame to maintain it at a height exceeding that of the curb base.
Figure 10:
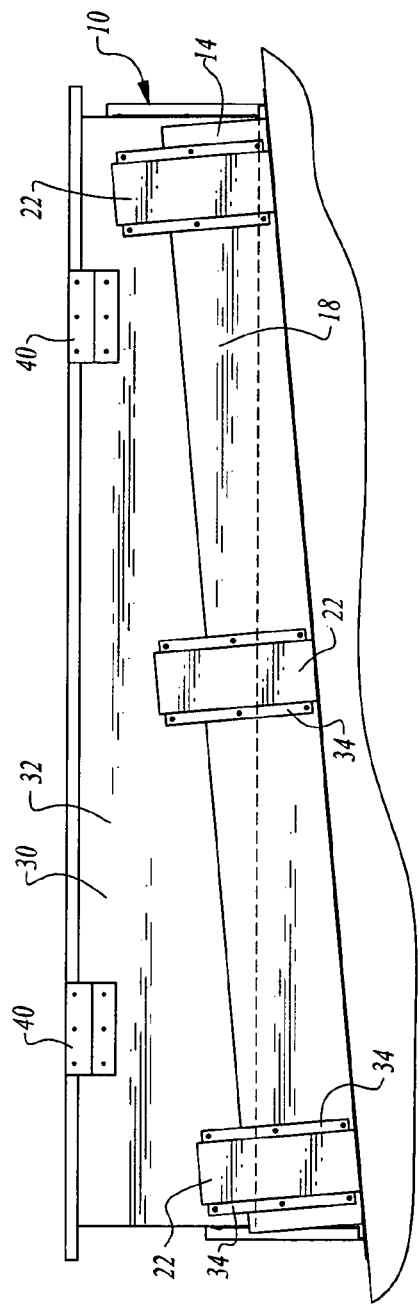
FIG. 10 is an elevational view showing the reinforcement members maintaining the curb frame level and angularly disposed relative to the curb base, the latter being on an inclined roof surface.

The curb 10 also includes a curb frame 30 for supporting the air conditioner. The curb frame 30 is suitably formed of sheet metal. The curb frame has attached downwardly extending curb frame side walls 32 positionable in the receptacle interiors of the open topped receptacles formed by the side walls and stiffeners and is selectively adjustable relative to the curb base and the reinforcement members. The curb frame may be moved up and down within the receptacle in its entirety (to change overall curb height) or the curb frame may be pulled up at just one of the ends thereof to form an angle relative to the curb base to adapt to inclined roof surfaces. FIGS. 9 and 10, respectively, show these orientations.

The curb base and the curb frame are of rectangular configuration and thus the curb itself is of rectangular configuration and has four corners. A pair of stiffeners 22 are located at each corner, the stiffeners 22 of each pair thereof being located at and secured to adjacent ends of the base side walls at the corners.

Figure 7:
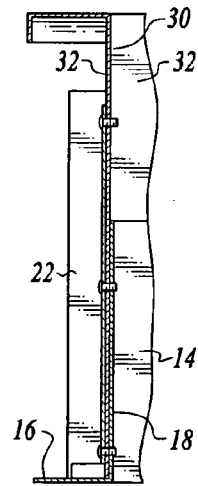
FIG. 7 is a greatly enlarged cross-sectional view taken along line 7-7 of FIG. 1.

The stiffeners 22 have holes formed therein; more particularly, the holes are located in channel flanges 34 projecting outwardly from both sides of the main channel body. Once the curb frame has been manually positioned to the desired angular relationship with the curb base 14, threaded sheet metal screws are introduced into the openings and screwed into place so that they extend through the stiffeners 22, the base side walls 18 and the curb frame side walls 32 as shown for example in FIG. 7. The sheet metal screws or other threaded fasteners being employed provide a rigid interconnection between the stiffeners 22, the base side walls 18 and the curb frame side walls 32 with the curb frame side walls clampingly engaged between the stiffeners and the base side walls to form a locked curb of unitary construction resistant to deformation thereof upon application of seismic or other outside forces thereto.

Figure 6:
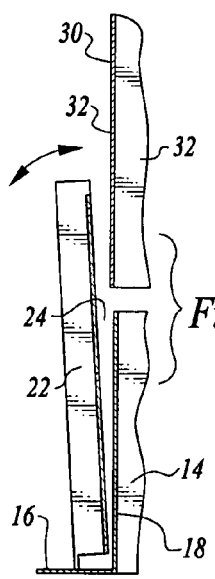
FIG. 6 is a greatly enlarged cross-sectional view taken along line 6-6 of FIG. 5.
Figure 8:
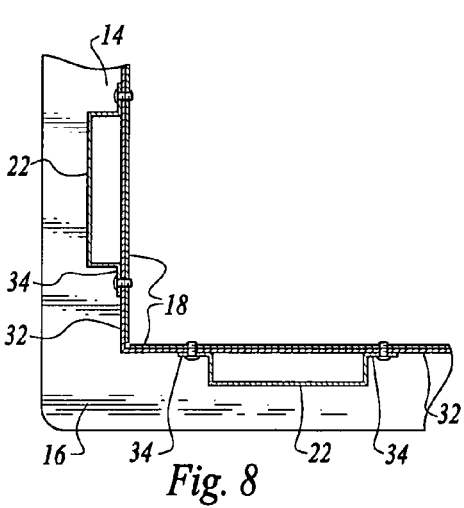
FIG. 8 is a greatly enlarged sectional view taken along line 8-8 of FIG. 1.

FIG. 8 illustrates the structure at a corner of the locked curb. The stiffeners 22 are free to bend to some degree relative to the flange 16, as shown in FIG. 6, enabling the stiffeners to maintain tight engagement. The tapered distal ends of the base side walls allow the stiffeners 22 and the base side walls to move inwardly in unimpeded fashion so that a secure and rigid interconnection is provided between the structural elements of the curb.

It is to be noted that the elongated, vertically extending stiffeners 22 extend upwardly from the curb base beyond the base side walls. Not only does this allow a very wide adjustability range between the curb base and the curb frame when all curb frame side walls remain within the confines of the base side walls, this feature allows all or a portion of the curb frame to be located above the curb base side walls whereby the stiffeners can be directly secured to the curb frame side walls above the curb base to support all or a portion of the curb frame at a location above the curb base. FIG. 9 shows by means of dash lines positioning of the entirety of the curb frame above the curb base.

In the arrangement illustrated, the curb frame includes a support ledge 38 affixed to the tops of the curb frame side walls for mounting air conditioner hold down brackets 40.

The invention claimed is:

1. An adjustable air conditioner curb for mounting an air conditioner on a roof, said adjustable air conditioner curb comprising, in combination:
   a curb base having a roof attachment structure for attaching the curb base to a roof and base side walls extending upwardly from said roof attachment structure;
   a plurality of reinforcement members having upper ends and lower ends, said reinforcement members spaced from one another, the lower ends of said reinforcement members attached to said roof attachment structure and extending upwardly therefrom adjacent to said base side walls, said base side walls and said reinforcement members forming open topped receptacles defining receptacle interiors above said reinforcement member lower ends;
   a curb frame for supporting an air conditioner, said curb frame having downwardly extending curb frame side walls positionable in the receptacle interiors of said open topped receptacles and selectively adjustable relative to said curb base and said reinforcement members; and
   fasteners for attaching said curb frame to said curb base and to said reinforcement members whereby said curb frame is fixedly maintained at a selected predetermined position relative to said curb base.

2. The adjustable air conditioner curb according to claim 1 wherein said reinforcement members comprise elongated, rigid, vertically extending stiffeners.

3. The adjustable air conditioner curb according to claim 2 wherein said stiffeners are metal channels receiving said fasteners to provide a rigid interconnection between said metal channels, said base side walls and said curb frame side walls, with said curb frame side walls clampingly engaged between said metal channels and said base side walls to form a locked curb of unitary construction resistant to deformation thereof upon application of seismic forces or other forces thereto.

4. The adjustable air conditioner curb according to claim 3 wherein said curb base and said curb frame are constructed of sheet metal and wherein said fasteners comprise sheet metal screws or other threaded fasteners extending through said metal channels, said curb frame side walls and said base side walls.

5. The adjustable air conditioner curb according to claim 1 being of rectangular configuration and having corners.

6. The adjustable air conditioner curb according to claim 5 wherein a pair of said reinforcement members are located at each corner, the reinforcement members of each pair of reinforcement members being located at and secured to adjacent ends of said base side walls and to said curb frame side walls at said corners.

7. The adjustable air conditioner curb according to claim 2 wherein said elongated, rigid, vertically extending stiffeners extend upwardly from said curb base beyond said base side walls whereby said elongated, rigid, vertically extending stiffeners can be directly secured to said curb frame side walls above said curb base to support at least a portion of said curb frame at a location above said curb base.

8. The adjustable air conditioner curb according to claim 1 wherein the base side walls have base side wall distal ends which are not attached together, whereby pivotal movement of each of said base side walls relative to said roof attachment structure is unimpeded by adjacent base side walls when said base side walls are not affixed to said curb frame side walls by said reinforcement members.

9. The adjustable air conditioner curb according to claim 1 wherein the roof attachment structure comprises a peripheral flange and the lower ends of said reinforcement members are welded to said flange.

10. The adjustable air conditioner curb according to claim 4 wherein said metal channels include channel flanges defining spaced holes along the lengths thereof for receiving said threaded fasteners.

11. The adjustable air conditioner curb according to claim 1 wherein said curb frame includes a support ledge affixed to tops of said curb frame side walls for supporting air conditioner hold down brackets.

\* \* \* \* \*